March 28, 1933. L. BLACKMORE 1,903,088
AXLE HOUSING AND METHOD OF MAKING THE SAME
Filed Sept. 8, 1930
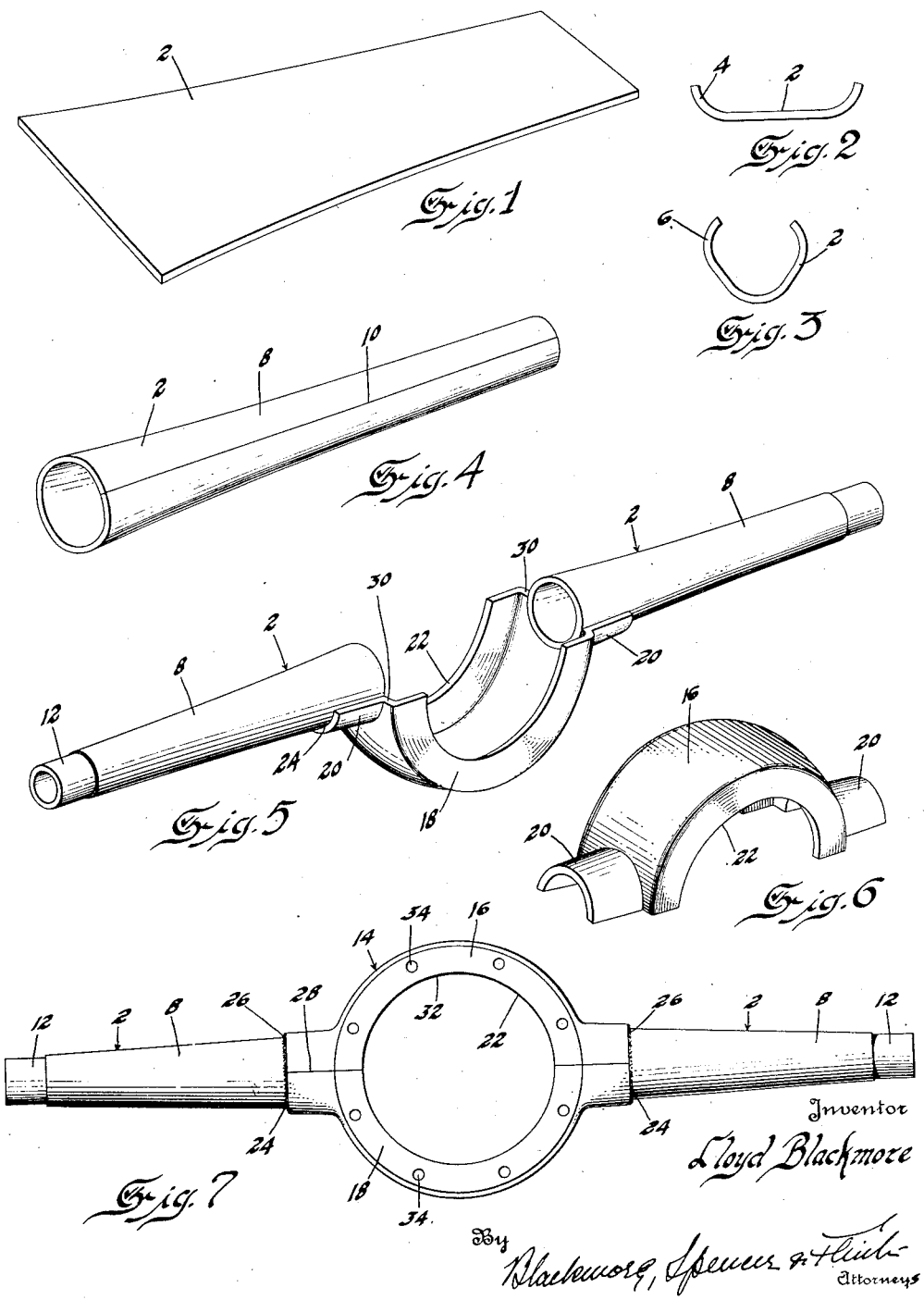

Patented Mar. 28, 1933

1,903,088

UNITED STATES PATENT OFFICE

LLOYD BLACKMORE, OF DETROIT, MICHIGAN, ASSIGNOR TO GENERAL MOTORS CORPORATION, OF DETROIT, MICHIGAN, A CORPORATION OF DELAWARE

AXLE HOUSING AND METHOD OF MAKING THE SAME

Application filed September 8, 1930. Serial No. 480,438.

This invention relates to axles and has particular reference to improvements in rear axle housings of automotive vehicles.

The axle housing is of the banjo type and comprises a mid section or differential housing composed of two symmetrical stamped halves and tubular end sections comprising similar tubes formed from flat stock.

In assembling, the two types are positioned in one of the mid section halves and securely welded in place. The other mid section half is then placed on the first and in turn welded in position to form a rigid and secure hold.

On the drawing:

Figure 1 is a perspective view of a flat sheet of stock from which the tubular end portions are formed.

Figure 2 is an end view of Figure 1 with the ends of the stock partially turned up.

Figure 3 is another step in the formation of the tubular end portions.

Figure 4 is a perspective view of the completed tubular end portion.

Figure 5 is a perspective view of the assembled axle with the upper half of the mid portion removed.

Figure 6 is a perspective view of one of the halves of the mid section.

Figure 7 shows an elevational view of the completed axle housing.

Referring to the drawing the numeral 2 indicates a flat sheet of stock of truncated form from which the tubular end sections are formed. The sides of the sheet tube are rolled up as at 4 in Figure 2 and then at 6 in Figure 3 as steps in the formation of the tubular form indicated at 8 in Figure 4. If desired the tube may be welded along the line 10 at the meeting place of the edges of the sheet. In its completed form the tube 8 will be tapered and have a greater diameter at one end than at the other.

Before assembly into the axle the outer ends 12 of the side members 8 may be finished so that they may be more easily assembled with the wheel structure.

The mid portion or differential housing section of the axle housing is indicated as a whole at 14 and comprises the upper and lower symmetrical halves 16 and 18. The halves are semi-circular and have the lateral necks or extensions 20 and the flanges 22. The sections 16 and 18 are preferably stamped from flat stock.

Referring to Figure 5, it will be seen that the larger ends of the tubular sides 8 are assembled in the extensions 20 of the lower mid-section member 18, after which a second mid-section as shown in Figure 6 is placed in position to form the upper part of the housing, and welded to the lower half along the meeting surfaces 28 and 30.

The upper and lower mid-sections are of course under considerable pressure during the welding operation, so that they fit very snugly over the ends of the tubes 8 while still hot, and when cooling will complete a shrink-fit with said tubes.

The weld along the surfaces 30 may be found sufficient to hold all parts together as the metal from the weld will partially unite with the tube ends; though if desired the parts may be further secured together by tacking or welding the ends of the extensions 20 to the tubes at 24 and 26.

I claim:

1. An axle housing comprising tubular end sections and two semi-circular sections welded together and over the inner ends of said tubular section to form a center ring section.

2. An axle housing comprising tapered tubular welded end sections and two semi-circular mid-sections with end extensions fitted over the inner ends of said tubular sections and welded together to form a central ring section.

3. The method of making a banjo-type axle consisting of forming from flat stock two similar tubular end sections, welding the seams of said end sections, forming from flat stock two similar channelled semi-circular mid-section halves with end extensions, fitting said mid-section halves in abutting position with the end extensions enveloping the inner ends of said tube sections, and welding said center sections together.

In testimony whereof I affix my signature.

LLOYD BLACKMORE.